UNITED STATES PATENT OFFICE.

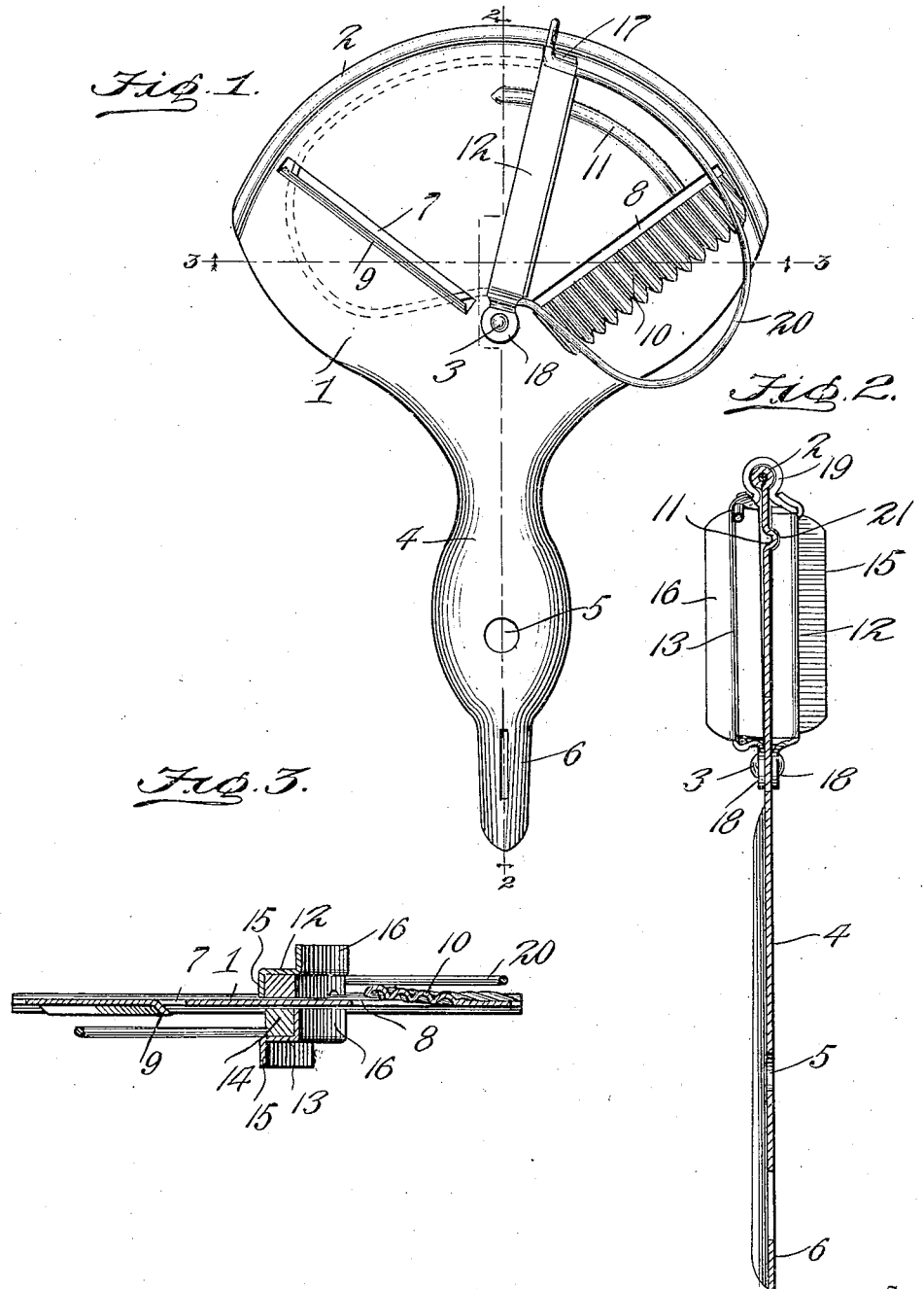

J EVERETT WALSTON, OF LANSING, MICHIGAN.

FRUIT AND VEGETABLE SLICER.

No. 875,473.  Specification of Letters Patent.  Patented Dec. 31, 1907.

Application filed June 29, 1907. Serial No. 381,463.

*To all whom it may concern:*

Be it known that I, J EVERETT WALSTON, a citizen of the United States, residing at Lansing, in the county of Ingham and State of Michigan, have invented new and useful Improvements in Fruit and Vegetable Slicers, of which the following is a specification.

This invention relates to improvements in fruit and vegetable slicers, the object of the invention being to provide a simple, convenient and inexpensive construction of device of this character which may be readily manipulated for slicing fruits or vegetables into straight or corrugated strips or long and narrow strips of the so-called "shoe-string" type.

The invention consists of the novel features of construction, combination and arrangement of parts hereinafter fully described and claimed, reference being had to the accompanying drawings in which:—

Figure 1 is a side elevation of a fruit and vegetable slicer embodying my invention. Fig. 2 is a vertical longitudinal section thereof on line 2—2 of Fig. 1. Fig. 3 is a vertical cross-section on line 3—3 of Fig. 1.

Referring to the drawing, the numeral 1 designates a segmental disk or plate, which may be in practice approximately of quadrantal form and has its outer curved edge beaded, as shown at 2, and its body portion perforated for the passage of a pivot pin 3 at a point constituting the center from which the arc of curvature of the beaded edge 2 is struck. The inner edge of the disk is prolonged in the form of an elongated strip 4 of concavo convex contour throughout its length to provide a handle of the requisite strength, which handle is formed with an opening 5 to adapt the device to be conveniently suspended from a suitable support. At the outer end of the handle is a concavo-convex extension 6 constituting a coring blade, the side edges of which are preferably sharpened to adapt said blade to also serve the function of a peeling knife.

Formed in the disk are radial slots 7 and 8 extending in opposite directions from a point adjacent the pivot pin to the beaded edge 2 near the extremities of the latter. One of the walls of the slot 8 is bent laterally and shaped to provide a straight cutting knife 9 projecting from one of the sides of the disk, while one of the walls of the slot 8 is similarly bent and shaped to provide a corrugated cutting knife 10 projecting from the opposite side of the disk, the corrugations of which knife 10 may be of any suitable form in cross-section. The disk is also struck up to provide a curved rib 11 extending parallel with the beaded edge 2 from the central longitudinal line of the disk to the inner wall of the slot 8 in line with the depressed portion of one of the corrugations of the knife 10, said rib being designed to perform the dual function of a guide and cutting gage, as hereinafter described.

A swinging follower frame is provided and comprises arms 12 and 13 arranged on opposite sides of the disk and pivotally mounted at their inner ends upon the pin 3. Each of these arms comprises a strip of sheet metal bent to form a body portion covering the outer side of a bar 14 and outwardly and inwardly extending flanges 15 and 16 at the front and rear of the body portion, considering the direction of movement of said arm relative to the coacting cutting knife. As shown, the rear flange 16 is bent over upon the rear edge of the bar 14 to strengthen and stiffen the same, while the front flange 15 projects laterally in an outward direction to lie flush or nearly so with the front face of the bar to increase the effective width of the surface of the follower designed to bear upon the portion of fruit or vegetable to be fed toward the cutting knife.

Each arm is provided at its upper and lower ends with ears 17 and 18 through which fastenings may pass to unite the arm and bar, and the ear 18 projects sufficiently to form a pivot portion to engage the pin 3. The swinging frame is completed by the provision of a single piece of wire having its ends clamped and secured between the inner ears 18 of the respective opposite follower arms and inner ends of the bars thereof and its central portion bent to provide a guide loop or yoke 19 engaging the beaded edge 2, and between this yoke center and its respective ends the wire is looped to form an operating handle 20 for each follower, by which the follower frame as a whole may be swung from either side of the disk. In order to securely sustain and embrace the wire, the angular portions thereof connecting the yoke 19 with the loop handles 20 are extended between the outer ends of the bars 14 and outer ears 17 of the respective arms and are clamped and secured by the latter to the two followers. The bar 14 of the follower arm 12 is grooved on its inner face, as indicated at 21 to receive the rib 11 and allow said bar to move in close contact with the disk and to be guided by the rib.

In the use of the device for cutting corrugated strips from fruits or vegetables, the vegetable is first cut or divided into portions of suitable size and the portions individually sliced by placing each portion upon the face of the disk from which the knife projects between said knife and the follower member 12 and swinging said member toward the knife by the coacting handle 20, in which operation the knife 10 will slice off a corrugated strip, which will discharge through the slot 8. In cutting straight slices the device is reversed, the portion of the fruit or vegetable placed against the opposite face of the disk between the follower member 13 and the knife 9 and said follower member swung by its handle to force the said portion toward the knife 9, whereby a straight slice will be cut off and discharged through the slot 7. In slicing the fruit or vegetable into "shoestring" strips, a corrugated slice is first cut off the portion of the fruit or vegetable by the knife 10, and then by resting the corrugated face of the portion against the disk so that the rib 11 will project into one of the grooves of the corrugations therein and then feeding said portion forward in the usual way, the elevated portions of the corrugations 10 sever the rib-like projections from the fruit or vegetable in the form of long narrow strips. This action is secured by reason of the fact that the rib 11 will set the grooves and ribs of the corrugations in the vegetable and knife out of registering relation, so that the elevated portions of the corrugations of the knife will cut away the ribbed portions previously formed upon the fruit or vegetable in the operation of cutting the fluted slice.

It will thus be seen that my invention provides a device of simple construction for the purpose stated which is convenient and effective in use and may be manufactured and sold at a comparatively low cost.

Having thus described the invention, what I claim as new and desire to secure by Letters Patent is:—

1. A fruit or vegetable slicer comprising a disk carrying a pivot member and having slots radiating therefrom, plain and corrugated cutting knives along the margins of the respective slots and extending from opposite sides of the disk, a swinging frame supported by said pivot member and carrying followers on opposite sides of the disk for coöperation with said knives, and handles applied to the frame for swinging the same from either side of the disk.

2. A fruit or vegetable slicer comprising a disk having an arcuate edge and carrying a pivot member constituting the center from which the arc of curvature of said edge is struck, said disk being further provided with slots on opposite sides of the center thereof radially arranged between the pivot member and curved edge, cutting knives along the margins of the slots and projecting from the opposite faces of the disk, a swinging frame pivotally supported by said pivot member and having portions on opposite sides of the disk connected by a yoke in guided engagement with the curved edge, followers carried by said portions for coaction with the respective knives, and handles applied to the frame portions, whereby the frame may be swung from either side of the disk.

3. A fruit or vegetable slicer comprising a disk provided with radial slots, plain and corrugated cutting knives along said slots and projecting from the opposite faces of the disk, a swinging frame carrying a pair of follower members arranged on opposite sides of the disk for respective coöperation with said knives, and means for operating the frame from either side of the disk.

4. A fruit or vegetable slicer comprising a disk provided with radial slots, plain and corrugated cutting knives at the outer sides of the slots and extending from opposite sides of the disk, a swinging frame pivotally mounted upon the disk and in guided connection with the edge thereof, said frame including followers on opposite sides of the disk for coaction with the respective knives, and handles forming part of the frame on opposite sides of the disk.

In testimony whereof, I affix my signature in presence of two witnesses.

J EVERETT WALSTON.

Witnesses:
D. J. GILLAM,
BEDA M. FORNBLOM.